US012631822B2

(12) United States Patent      (10) Patent No.:   US 12,631,822 B2

Xu et al.      (45) Date of Patent:     May 19, 2026

(54) OPTICAL WAVEGUIDE AND METHOD OF MANUFACTURE THEREOF

(71) Applicant: NTT, Inc., Tokyo (JP)

(72) Inventors: Xuejun Xu, Tokyo (JP); Takehiko Tawara, Tokyo (JP); Tai Tsuchizawa, Tokyo (JP)

(73) Assignee: NTT, INC., Tokyo (JP)

( * ) Notice: Subject to any disclaimer, the term of this patent is extended or adjusted under 35 U.S.C. 154(b) by 299 days.

(21) Appl. No.: 18/547,662

(22) PCT Filed: Feb. 25, 2021

(86) PCT No.: PCT/JP2021/007028

§ 371 (c)(1),
(2) Date: Aug. 23, 2023

(87) PCT Pub. No.: WO2022/180730

PCT Pub. Date: Sep. 1, 2022

(65) Prior Publication Data

US 2024/0134119 A1     Apr. 25, 2024
US 2024/0230997 A9     Jul. 11, 2024

(51) Int. Cl.
    *G02B 6/12*          (2006.01)
    *G02B 6/13*          (2006.01)
(52) U.S. Cl.
    CPC .... *G02B 6/131* (2013.01); *G02B 2006/12061* (2013.01); *G02B 2006/1208* (2013.01)
(58) Field of Classification Search
    CPC ............................................. G02B 2006/1208
    See application file for complete search history.

(56) References Cited

U.S. PATENT DOCUMENTS

2005/0226591 A1 * 10/2005   Gardner ................. H01S 3/083
                                       385/147
2021/0223473 A1 * 7/2021   Bian .................... G02B 6/1228

FOREIGN PATENT DOCUMENTS

JP      2015032722 A   *   2/2015

OTHER PUBLICATIONS

Xu et al, Optical Properties of Er-incorporated Rare-Earth Oxide in Horizontal Slot Waveguide, JSAP Autumn Meeting Sep. 18, 2019 (Year: 2019).*

English translation of PCT/JP2021/007028 written opinion (Year: 2022).*

Xu et al., Low-loss erbium-incorporated rare-earth oxide waveguides on Si with bound states in the continuum and the large optical signal enhancement in them, vol. 29, No. 25 / Dec. 6, 2021 / Optics Express 41132 (Year: 2021).*

English translation of JP-2015032722-A (Year: 2015).*

Frankis et al., "Erbium-doped TeO2-coated Si3N4 waveguide amplifiers with 5 dB net gain," Photonics Research, vol. 8, No. 2, Feb. 2020, pp. 127-134. As discussed in the specification.

(Continued)

*Primary Examiner* — Charlie Y Peng

(74) *Attorney, Agent, or Firm* — Slater Matsil, LLP

(57) ABSTRACT

An optical waveguide includes a cladding layer, a Si layer, a REO layer, and a cap layer. The REO layer is made of a single-crystal rare earth oxide, and is formed on the Si layer. The cap layer is formed on the REO layer. The cap layer may be made of a material transparent to light to be guided. The cap layer has a stripe shape extending in a direction in which light is guided.

19 Claims, 12 Drawing Sheets

(56) References Cited

OTHER PUBLICATIONS

VÁZQUEZ-Córdova et al., "Erbium-doped spiral amplifiers with 20 dB of net gain on silicon," Optics Express, vol. 22, No. 21, Oct. 2014, 12 pages. As discussed in the specification.
Xu et al., "Optical Properties of Er-incorporated Rare Earth Oxide in Horizontal Slot Waveguide," The 80th JSAP Autumn Meeting, Proceedings, 2019 The Japan Society of Applied Physics, Sep. 2019, 1 page.

* cited by examiner

OPTICAL WAVEGUIDE AND METHOD OF MANUFACTURE THEREOF

CROSS-REFERENCE TO RELATED APPLICATIONS

This application is a national phase entry of PCT Application No. PCT/JP2021/007028, filed on Feb. 25, 2021, which application is hereby incorporated herein by reference.

TECHNICAL FIELD

The present invention relates to an optical waveguide using a rare earth oxide.

BACKGROUND

In recent years, with the aim of a Si-based photonic integrated circuit (Si photonics integrated circuits), integration of optical elements such as an optical waveguide, a light emitting element such as a laser, an optical amplifier, and a light detecting element on a Si substrate has progressed. Si-based photonic integrated circuits are considered one of the most promising and low-cost technologies to achieve, for example, high-speed and low-power consumption interconnections in data centers.

Rare earth doped materials are one of promising solutions for realizing Si-based optical amplifiers or lasers for realizing Si photonics integrated circuits. Rare earth-based materials are widely used as active media for optical amplifiers or lasers. Particularly, an erbium-doped fiber amplifier (EDFA) is a main optical amplifier used for long-distance optical fiber communication. In order to introduce the EDFA technology into a Si chip, an erbium-doped optical waveguide amplifier (EDWA) is employed. However, since the concentration of a rare earth element that can be added to a solid material generally used in this type of technology is low, only an optical gain of one-digital dB/cm or less is achieved. This requires very long devices to achieve a necessary optical gain and is not feasible on Si chips.

In contrast to the EDWA described above, a thin film of a single-crystal rare earth oxide (REO) has a higher Er concentration and a higher crystal quality than any other materials, and can be epitaxially grown on Si substrates. Thus, a REO is a promising material for application to Si based photonic integrated circuit technology.

Here, for example, in order to realize a laser, an optical amplifier, or the like on a Si substrate, an optical waveguide structure using the REO and having a low propagation loss and a high optical confinement factor is desirable. In order to ensure light propagation in an optical waveguide, a core with a higher refractive index, which is usually surrounded by a cladding with a lower refractive index, is important. In a conventional Er-doped amorphous or polycrystalline materials, the following two optical waveguide structures are known.

First, there is a configuration in which a material ($Al_2O_3$) with a high refractive index is used as a core doped with Er, and a material with a low refractive index is used as a cladding (Non Patent Literature 1). In this type of optical waveguide, typically, a lower cladding is made of $SiO_2$, and an upper cladding is made of $SiO_2$ or air.

Second, there is a configuration in which a material with a high refractive index (for example, SiN) is used as a core, and a low refractive index material doped with Er is used as an upper cladding (Non Patent Literature 2).

CITATION LIST

Non Patent Literature

Non Patent Literature 1: S. A. Vazquez-Cordova et al., "Erbium-doped spiral amplifiers with 20 dB of net gain on silicon", Optics Express, vol. 22, no. 21, pp. 25993-26004, 2014.
Non Patent Literature 2: H. C. FRANKIS et al., "Erbium-doped TeO2-coated Si3N4 waveguide amplifiers with 5 dB net gain", Photonics Research, vol. 8, no. 2, pp. 127-134, 2020.

SUMMARY

Technical Problem

In the case of a single-crystal REO thin film, a high-quality REO cannot be grown on $SiO_2$, and is grown only on single-crystal Si. Thus, neither of the two optical waveguide structures described above can be applied. A most straightforward waveguide structure is a Si core with an upper cladding made of a REO. It is conceivable that this structure is manufactured by growing a REO thin film on a silicon on insulator (SOI) substrate and sequentially patterning the grown REO thin film and a surface silicon layer of the SOI substrate through etching process or the like.

However, the above-described optical waveguide structure has two problems. First, since a refractive index (about 1.6 to 2.0) of the REO is much lower than a refractive index (about 3.45) of Si, waveguide modes are mostly concentrated in the layer of Si. Thus, an optical confinement factor ($\Gamma_{REO}$) of the layer of the REO is usually very small, typically less than 10%. A mode gain ($g_{modal}$) of the EDWA is related to both a material gain ($g_{material}$) and the optical confinement factor and can be indicated by "$g_{modal}=\Gamma_{REO}\times g_{material}$". For the optical waveguide structure described above, an achievable mode gain is restricted by the low optical confinement factor.

Furthermore, a REO is known to be very difficult to etch, and a REO processing method has not been established. Therefore, the above-described optical waveguide structure cannot be manufactured at the present time.

As described above, it is not easy to manufacture an optical waveguide using a REO that can be integrated with a high-performance Si-based optical amplifier, a laser, or the like, and, therefore, there is a problem that an optical waveguide for realizing an optical amplifier, a laser, or the like cannot be easily manufactured.

Embodiments of the present invention have been made to solve the above problems, and an object thereof is to easily manufacture an optical waveguide for realizing an optical amplifier, a laser, and the like.

Solution to Problem

An optical waveguide according to embodiments of the present invention includes: a cladding layer; a Si layer made of single-crystal Si and formed on the cladding layer; a REO layer made of a single-crystal rare earth oxide and formed on the Si layer; and a stripe-shaped cap layer formed on the REO layer and extending in a direction in which light is guided.

Advantageous Effects of Embodiments of Invention

As described above, according to embodiments of the present invention, since only the cap layer, instead of REO layer, is processed, an optical waveguide for realizing an optical amplifier, a laser, and the like can be easily manufactured.

DETAILED DESCRIPTION OF ILLUSTRATIVE EMBODIMENTS

Figure 1:
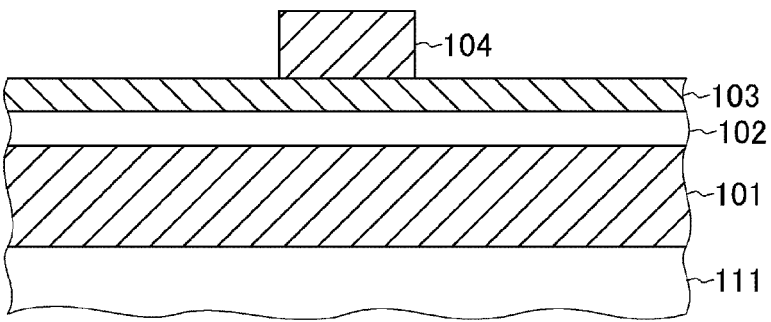
FIG. 1 is a configuration diagram illustrating a configuration of an optical waveguide according to an embodiment of the present invention.

Hereinafter, an optical waveguide according to an embodiment of the present invention will be described below with reference to FIG. 1. The optical waveguide includes a cladding layer 101, a Si layer 102, a REO layer 103, and a cap layer 104.

The cladding layer 101 is formed on a substrate 111. The cladding layer 101 may be made of, for example, a silicon oxide. The Si layer 102 is made of single-crystal Si and is formed on the cladding layer 101. A surface of the Si layer 102 may be, for example, a (in) plane or a (100) plane. For example, a well-known silicon on insulator (SOI) substrate may be used, a silicon substrate portion of the SOI substrate may be the substrate 111, a buried insulating layer may be the cladding layer 101, and a surface Si layer may be the Si layer 102. In this case, the cladding layer 101 generally has a thickness of 2 μm or more, and the Si layer 102 has a thickness of 50 to 200 nm.

The REO layer 103 is made of a single-crystal rare earth oxide, and is formed on the Si layer 102. The REO layer 103 may be made of, for example, $(Er_xGd_{1-x})_2O_3$. The REO layer 103 may have a thickness of 50 to 200 nm.

The cap layer 104 is formed on the REO layer 103. The cap layer 104 may be made of a material transparent to light to be guided. For example, the cap layer 104 may be made of SiN or Si. The cap layer 104 has a stripe shape (mesa shape) extending in a direction in which light is guided. For example, in a case where the cap layer 104 is made of SiN, the cap layer may have a thickness of 300 to 500 nm.

According to the above-described embodiment, the REO layer 103 is formed on the Si layer 102, but since the cap layer 104 with a refractive index higher than that of air is further formed thereon, the guided mode moves to the cap layer 104 side. As a result, the center of guided light mode is in the vicinity of an interface between the Si layer 102 and the REO layer 103 in the region where the cap layer 104 is formed. The optical waveguide according to the embodiment may be optically connected to, for example, a Si optical waveguide including a Si core formed by patterning the Si layer 102 in another region of the cladding layer 101.

The following is a more detailed explanation. In the optical waveguide according to the above-described embodiment, TM-polarized light is propagated (guided), and an electric field component thereof is a component in a direction perpendicular to the surface of the substrate in (cladding layer 101). A wavelength range of the guided light of the optical waveguide is around the S band, the C band, and the L band of the wavelength band used in optical communication.

Figure 2:
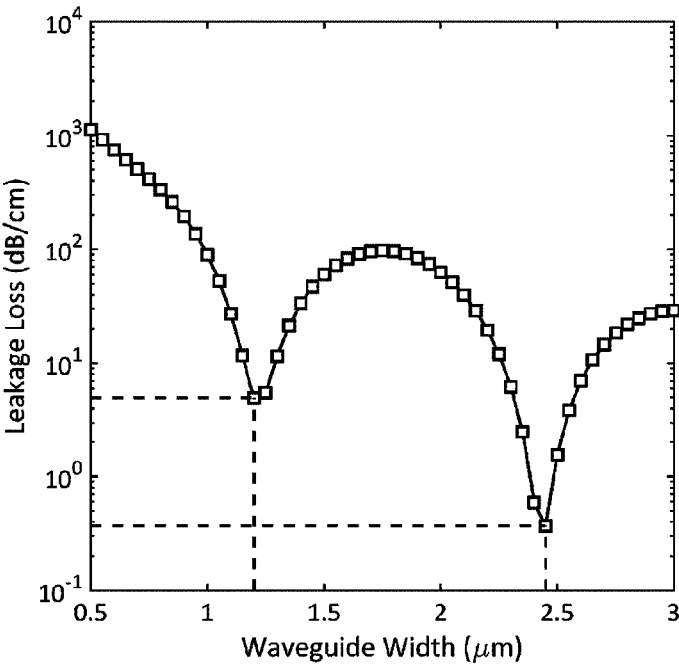
FIG. 2 is a characteristics diagram illustrating a calculation result of a leakage loss of guided light with a wavelength of 1462 nm for an optical waveguide in which a width of a cap layer 104 is in a range of 0.5 to 3 μm using numerical simulation based on a finite element optical waveguide mode solver.

A width of the cap layer 104 is important to achieve a low propagation loss. FIG. 2 illustrates a calculation result of a leakage loss of guided light with the wavelength of 1462 nm for an optical waveguide in which a width of the cap layer 104 is in the range of 0.5 to 3 μm using the numerical simulation based on a finite element optical waveguide mode solver. The REO layer 103 is made of, for example, $(Er_xGd_{1-x})_2O_3$, and the Er composition is x=0.057. The thickness of the cladding layer 101 is 2 μm, the thickness of the Si layer 102 is 70 nm, the thickness of the REO layer 103 is 60 nm, and the thickness of the cap layer 104 made of SiN is 300 nm.

As illustrated in FIG. 2, the leakage loss strongly depends on a width W of the cap layer 104, and two local minima at W=1.20 μm and W=2.45 μm are illustrated. Hereinafter, this width will be referred to as an optimized width. Corresponding minimum loss values are 4.96 dB/cm for W=1.20 μm and 0.37 dB/cm for W=2.45 μm. These losses are comparable to the state of the art of conventional Si optical waveguides and are low enough to be used in many device applications such as optical waveguide amplifiers and lasers. The leakage loss can be optimized by controlling the width W.

Figure 3:
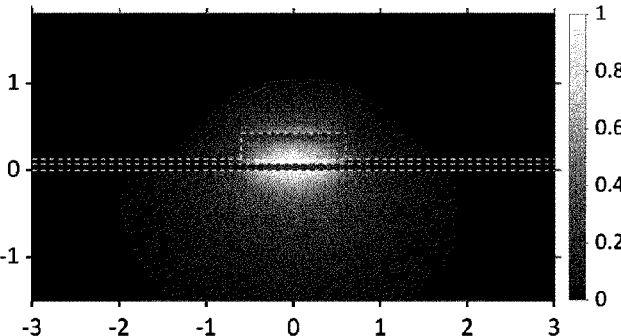
FIG. 3 is an electric field profile of a fundamental TM mode of an optical waveguide in which the cap layer 104 has an optimized width W=1.20 μM.

FIG. 3 illustrates an electric field profile of a fundamental TM mode of an optical waveguide in which the cap layer 104 has the optimized width W=1.20 μm. This indicates that the mode of the optical waveguide is sufficiently confined in the REO layer 103 and light can propagate along the optical waveguide with minimal loss. Optical waveguides with different parameters (a REO composition, a layer thickness, and wavelength) from the conditions described above may have different optimized widths of the cap layer 104. The optimized width of the cap layer 104 may be set by using similar numerical simulation methods.

Figure 4:
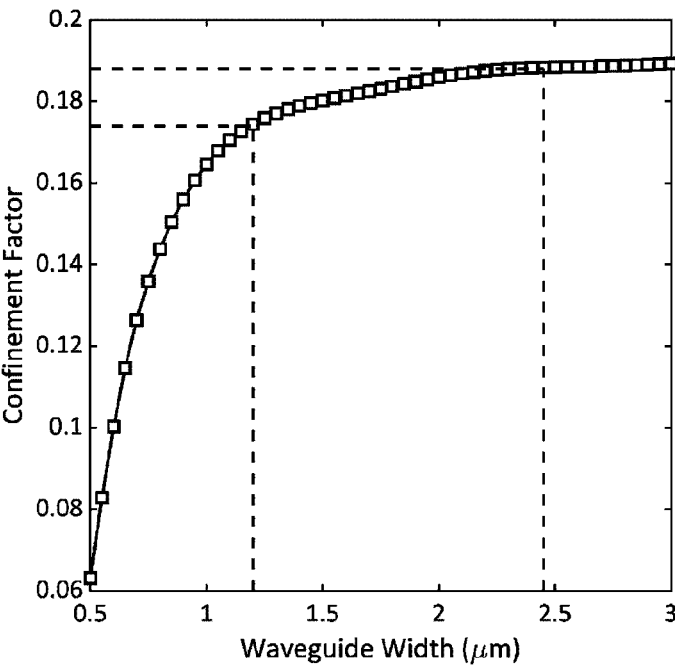
FIG. 4 is a characteristics diagram illustrating a calculation result of an optical confinement factor in a REO layer 103 for an optical waveguide using cap layers 104 with different widths.

FIG. 4 illustrates calculated optical confinement factors in REO layer 103 for an optical waveguide with different widths of the cap layer 104. The optical confinement factor is a value used to characterize an optical confinement intensity in the REO layer 103, and the larger the confinement factor, the stronger the light-matter interaction. The optical confinement factor at the optimized width of 1.20 μm of the cap layer 104 is calculated to be 17.4%. The optical confinement factor at the optimized width of 2.45 μm of the cap layer 104 is calculated to be 18.8%. These values are larger than those in the case of a normal Si optical waveguide.

Next, a method for manufacturing an optical waveguide according to the embodiment will be described with reference to FIGS. 5A to 5E.

Figure 5A:
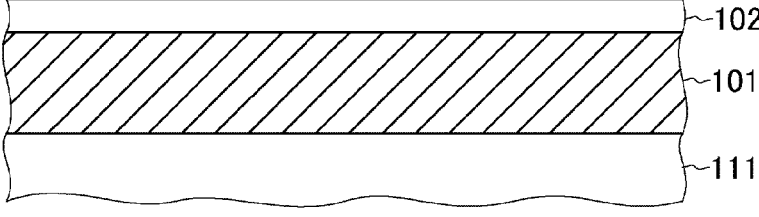
FIG. 5A is a sectional view illustrating a state of an optical waveguide in an intermediate step for describing a method of manufacturing the optical waveguide according to an embodiment of the present invention.

First, as illustrated in FIG. 5A, an SOI substrate including a buried insulating layer to be the cladding layer 101 and a surface Si layer to be the Si layer 102 on the substrate 111 is prepared, and cleaned by known cleaning recipe using a mixed solution of concentrated sulfuric acid and a hydrogen peroxide aqueous solution or a chemical solution such as hydrofluoric acid.

Figure 5B:
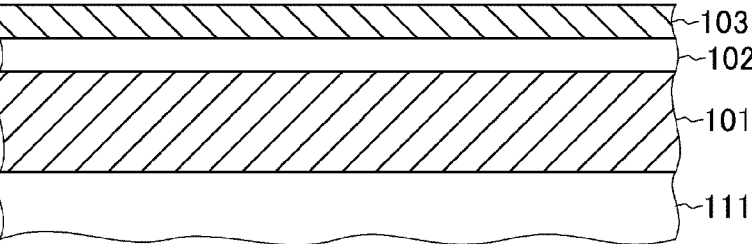
FIG. 5B is a sectional view illustrating a state of the optical waveguide in an intermediate step for describing the method of manufacturing the optical waveguide according to the embodiment of the present invention.

Next, $(Er_xGd_{1-x})_2O_3$ is epitaxially grown on the Si layer 102 according to a well-known molecular beam epitaxy method to form the REO layer 103 as illustrated in FIG. 5B. In the molecular beam epitaxy method, a solid source may be used as rare earth, and a gas source may be used as oxygen.

Figure 5C:
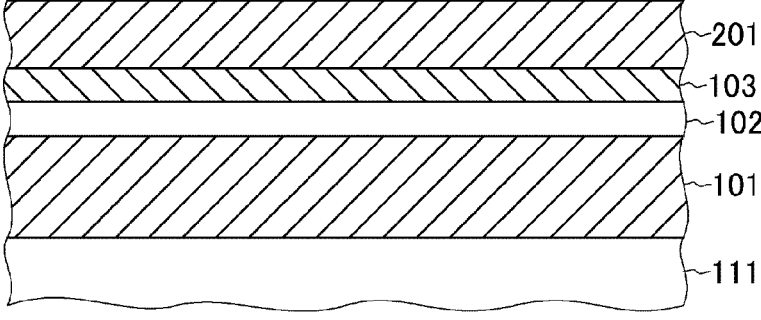
FIG. 5C is a sectional view illustrating a state of the optical waveguide in an intermediate step for describing the method of manufacturing the optical waveguide according to the embodiment of the present invention.

Next, as illustrated in FIG. 5C, a SiN layer 201 is formed on the REO layer 103 by depositing SiN according to a well-known electron cyclotron resonance plasma chemical vapor deposition method.

Figure 5D:
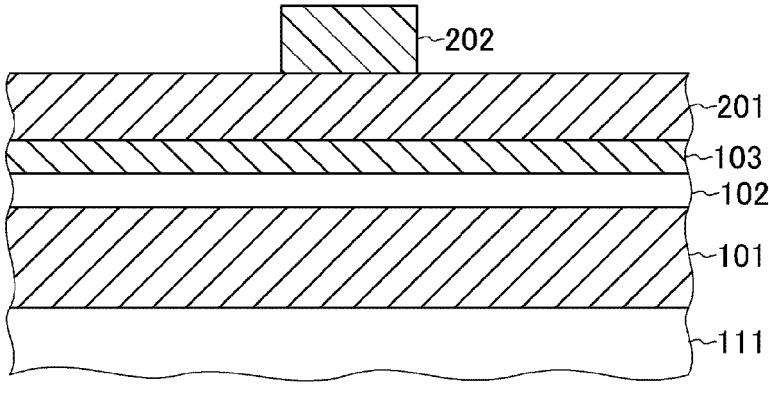
FIG. 5D is a sectional view illustrating a state of the optical waveguide in an intermediate step for describing the method of manufacturing the optical waveguide according to the embodiment of the present invention.

Next, as illustrated in FIG. 5D, a resist pattern 202 is formed on the SiN layer 201. The resist pattern 202 is formed in a stripe shape (mesa shape) extending in a direction in which light is guided. For example, a resist film is formed by spin-coating a photoresist or an electron beam resist on the SiN layer 201. Next, the resist film is exposed by using known photolithography or electron beam lithography to form a latent image. Thereafter, the resist film on which the latent image is formed is developed to form a resist pattern 202.

Figure 5E:
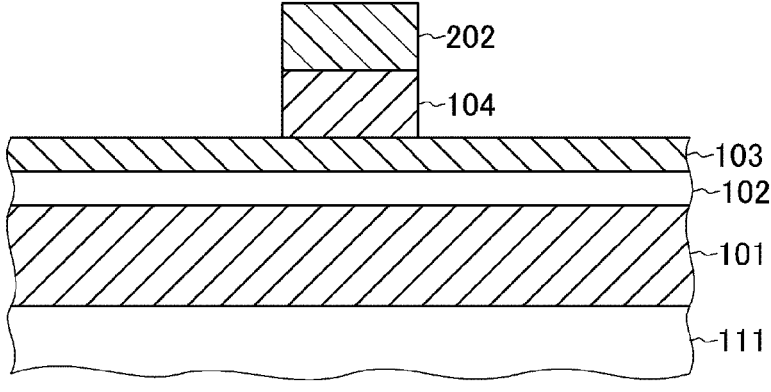
FIG. 5E is a sectional view illustrating a state of the optical waveguide in an intermediate step for describing the method of manufacturing the optical waveguide according to the embodiment of the present invention.

Next, by using the resist pattern 202 as a mask, the SiN layer 201 is etched by known reactive ion etching to form the cap layer 104 as illustrated in FIG. 5E. Thereafter, the remaining resist pattern 202 is removed to obtain the optical waveguide illustrated in FIG. 1. The above-described manufacturing method is currently a common technique generally used in manufacturing a semiconductor layer, and the optical waveguide according to the embodiment can be easily manufactured.

Figure 6:
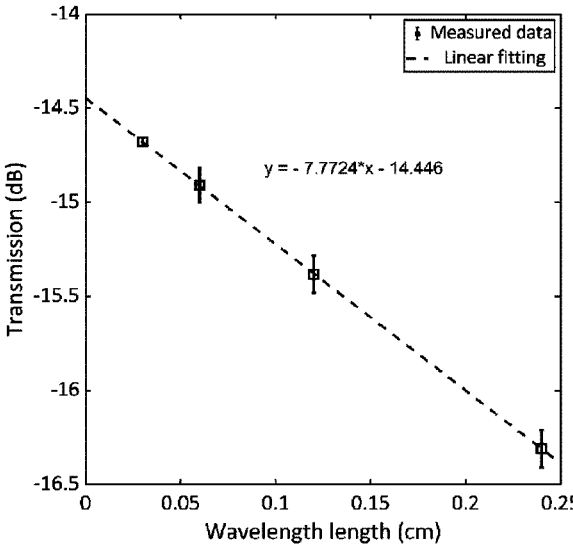
FIG. 6 is a characteristics diagram illustrating a measurement result of a propagation loss for light with a wavelength of 1490 nm is guided to the manufactured optical waveguide.

FIG. 6 illustrates a measurement result of propagation loss when light with a wavelength of 1490 nm is guided to the manufactured optical waveguide. The width of the cap layer 104 is 1.08 μm. In FIG. 6, an x axis indicates a length of the optical waveguide (waveguide length), and a y axis indicates the transmittance of the optical waveguide. By fitting data thereof with a linear function, a propagation loss may be extracted as a gradient of a fitting curve, and the propagation loss is as low as 7.77 dB/cm. This value matches the calculation result described above.

The optical waveguide according to the present invention is not limited to the above-described materials and dimensions. For example, the REO layer is not limited to $(Er_xGd_{1-x})_2O_3$, and may be made of a rare earth oxide having another composition. Embodiments of the present invention can also be applied to $SiO_2$, barium titanate ($BaTiO_3$), and the like instead of the REO. The cap layer is not limited to SiN, and may be made of other transparent materials. Examples thereof include $SiO_2$, $TiO_2$, and Si. As described above, the optimized width of the cap layer that minimizes the propagation loss may be determined through numerical simulation when respective conditions such as a material and a thickness are determined.

Figure 7:
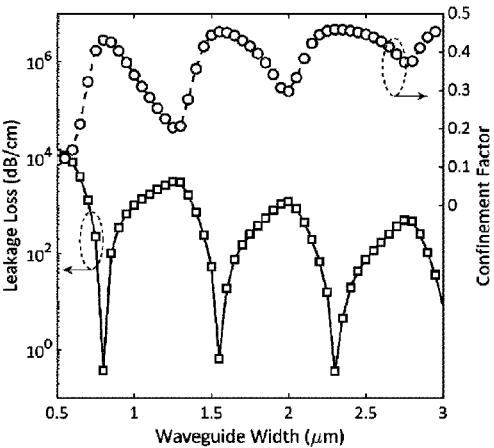
FIG. 7 is a characteristics diagram illustrating a calculation result of a leakage loss and an optical confinement factor when the cap layer is made of Si and a width of the cap layer is changed.

As the refractive index of the cap layer increases, the optical confinement factor can also be increased. This may be realized by replacing SiN with Si. As an example, FIG. 7 illustrates a calculation result of a leakage loss and an optical confinement factor when the cap layer is made of Si and a width of the cap layer is changed. The thickness of the Si layer below the REO layer is 70 nm, the thickness of the REO layer is 60 nm, and the thickness of the cap layer made of Si is 150 nm. The REO layer is made of $(Er_xGd_{1-x})_2O_3$, and the Er composition is x=0.057. The wavelength of the guided light is 1462 nm.

Figure 8:
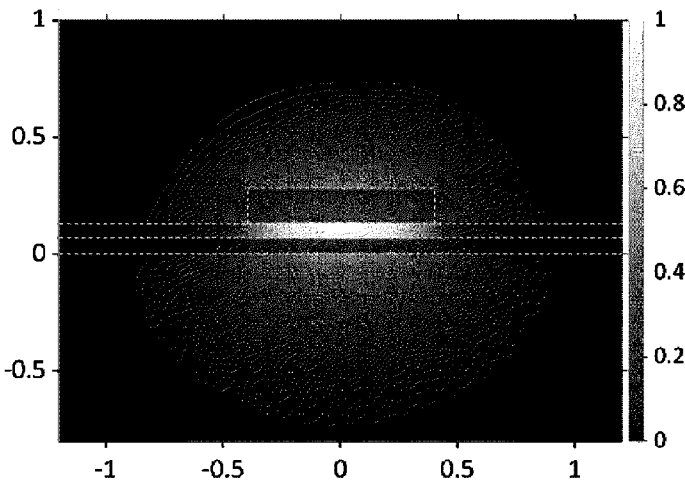
FIG. 8 is an electric field profile in a case where a cap layer is made of Si.

As illustrated in FIG. 7, the widths of the cap layer with the minimum leakage loss are 0.8 μm, 1.55 μm, and 2.3 μm. When the width of the cap layer is 0.8 μm, the minimum leakage loss is 0.37 dB/cm, and the optical confinement factor is 43.2%. When the width of the cap layer is 1.55 μm, the minimum leakage loss is 0.65 dB/cm, and the optical confinement factor is 45.3%. When the width of the cap layer is 2.3 μm, the minimum leakage loss is 0.36 dB/cm, and the optical confinement factor is 45.9%. These results are considerably greater than when the cap layer is made of SiN. FIG. 8 illustrates a mode profile of the optical waveguide when the width of the cap layer is 0.8 μm, which indicates that a large amount of light is confined in the REO layer.

As described above, according to embodiments of the present invention, since the cap layer is provided on the REO layer, an optical waveguide for realizing an optical amplifier, a laser, and the like can be easily manufactured.

In the optical waveguide according to embodiments of the present invention, by utilizing a mesa structure made of a commonly used material such as SiN or Si on a REO layer grown on a Si layer, the problems of a low confinement factor and manufacturing difficulty in the conventional optical waveguide can be solved. In order to achieve a low propagation loss, a width of the cap layer is appropriately optimized according to each parameter of the optical waveguide. The optical confinement factor in the REO layer can be further increased by using a higher refractive index cap layer. The structure of the optical waveguide according to the embodiments of present invention is general and can be applied to other functional materials grown on a Si substrate.

With the optical waveguide structure according to embodiments of the present invention, a low-loss optical waveguide with a large optical confinement factor for the REO layer grown on the Si layer can be realized. With this optical waveguide, the interaction between propagated light (guided light) and rare earth ions can be significantly enhanced, and thus a high-performance optical waveguide device based on rare earth ions, such as an optical waveguide type optical amplifier, a laser, and an on-chip optical quantum memory, can be realized.

The optical waveguide according to embodiments of the present invention can be manufactured by processing only the cap layer without requiring REO etching. Currently established general method for manufacturing a semiconductor device can be utilized for forming the cap layer. Therefore, it is extremely easy to manufacture the optical waveguide according to the present invention. The optical waveguide structure of embodiments of the present invention can also be applied to other functional materials grown on Si, and can realize a heterointegrated photonic device that cannot be realized by Si itself.

The present invention is not limited to the embodiment described above, and it is obvious that many modifications and combinations can be made by a person skilled in the art within the technical idea of the present invention.

REFERENCE SIGNS LIST

101 Cladding layer
102 Si layer
103 REO layer
104 Cap layer
111 Substrate

The invention claimed is:

1. An optical waveguide comprising:
a cladding layer;
a Si layer made of single-crystal Si and on the cladding layer;
a rare earth oxide (REO) layer made of a single-crystal rare earth oxide and disposed on the Si layer; and
a stripe-shaped cap layer on the REO layer and extending in a direction in which light is guided,
wherein
a width of the stripe-shaped cap layer is in a range of 2.45 μm to 3.0 μm, and
a leakage loss of guided light with a wavelength of 1462 nm is not more than 4.96 dB/cm.

2. The optical waveguide according to claim 1, wherein a center of a mode of light to be guided is in a vicinity of an interface between the Si layer and the REO layer in a region where the stripe-shaped cap layer overlaps the Si layer and the REO layer.

3. The optical waveguide according to claim 1, wherein the stripe-shaped cap layer is made of SiN or Si.

4. The optical waveguide according to claim 3, wherein the cladding layer is made of a silicon oxide.

5. The optical waveguide according to claim 4, wherein a center of a mode of light to be guided is in a vicinity of an interface between the Si layer and the REO layer in a region where the stripe-shaped cap layer overlaps the Si layer and the REO layer.

6. The optical waveguide according to claim 3, wherein a center of a mode of light to be guided is in a vicinity of an interface between the Si layer and the REO layer in a region where the stripe-shaped cap layer overlaps the Si layer and the REO layer.

7. The optical waveguide according to claim 1, wherein the cladding layer is made of a silicon oxide.

8. The optical waveguide according to claim 7, wherein a center of a mode of light to be guided is in a vicinity of an interface between the Si layer and the REO layer in a region where the stripe-shaped cap layer overlaps the Si layer and the REO layer.

9. The optical waveguide according to claim 1, wherein the REO layer is made of $(Er_xGd_{1-x})_2O_3$.

10. The optical waveguide according to claim 1, wherein a width of the cladding layer is in a range of 0.5 μm to 3 μm.

11. The optical waveguide according to claim 1, wherein:
the width of the stripe-shaped cap layer is 2.45 μm, and
the leakage loss of the guided light with the wavelength of 1462 nm is not more than 0.37 dB/cm.

12. A method of manufacturing an optical waveguide, the method comprising:
forming a Si layer made of single-crystal Si over a cladding layer;
forming a rare earth oxide (REO) layer contacting the Si layer, the REO layer being made of a single-crystal rare earth oxide; and
depositing a cap layer over the REO layer; and
patterning the cap layer to form a stripe-shaped cap layer on the REO layer and extending in a direction in which light is guided,
wherein:
a width of the stripe-shaped cap layer is in a range of 2.45 μm to 3.0 μm, and
a leakage loss of guided light with a wavelength of 1462 nm is not more than 4.96 dB/cm.

13. The method according to claim 12, wherein forming the REO layer comprises epitaxially growing the REO layer on the Si layer.

14. The method according to claim 12, wherein a center of a mode of light to be guided is in a vicinity of an interface between the Si layer and the REO layer in a region where the cap layer overlaps the Si layer and the REO layer.

15. The method according to claim 12, wherein the cap layer is made of SiN or Si.

16. The method according to claim 12, wherein the cladding layer is made of a silicon oxide.

17. The method according to claim 12, wherein the REO layer is made of $(Er_xGd_{1-x})_2O_3$.

18. The method according to claim 12, wherein a width of the cladding layer is in a range of 0.5 μm to 3 μm.

19. The method according to claim 12, wherein:
the width of the stripe-shaped cap layer is 2.45 μm, and
the leakage loss of guided light with the wavelength of 1462 nm is not more than 0.37 dB/cm.

* * * * *